(12) United States Patent
Micko et al.

(10) Patent No.: US 6,226,342 B1
(45) Date of Patent: May 1, 2001

(54) FUEL ASSEMBLY COMPRISING A COMPONENT FOR RETAINING ELONGATED ELEMENTS

(75) Inventors: Anders Micko, Windsor, CT (US); Peter Rudling, Västerås; Dietmar Wolfram, Eskilstuna, both of (SE)

(73) Assignee: ABB Atom AB, Vasteras (SE)

( * ) Notice: Subject to any disclaimer, the term of this patent is extended or adjusted under 35 U.S.C. 154(b) by 0 days.

(21) Appl. No.: 09/202,448

(22) PCT Filed: Jun. 18, 1997

(86) PCT No.: PCT/SE97/01084

§ 371 Date: Feb. 10, 1999

§ 102(e) Date: Feb. 10, 1999

(87) PCT Pub. No.: WO97/50091

PCT Pub. Date: Dec. 31, 1997

(30) Foreign Application Priority Data

Jun. 27, 1996 (SE) .................................................... 9602541

(51) Int. Cl.⁷ .............................. G21C 3/33; G21C 3/336; G21C 5/06

(52) U.S. Cl. .......................... 376/441; 376/414; 376/442; 376/448; 376/462; 376/305

(58) Field of Search ..................................... 376/438, 441, 376/442, 434, 448, 462, 305, 306, 414, 416, 417; 501/1; 264/603

(56) References Cited

U.S. PATENT DOCUMENTS

| | | | |
|---|---|---|---|
| 3,775,823 | 12/1973 | Adolph et al. | 29/182.5 |
| 4,707,330 | 11/1987 | Ferrari | 376/457 |
| 4,828,790 | * 5/1989 | Honda et al. | 376/306 |
| 5,019,333 | * 5/1991 | Isobe et al. | 420/422 |
| 5,026,517 | * 6/1991 | Menken et al. | 376/438 |
| 5,085,806 | * 2/1992 | Yasutomi et al. | 252/518 |
| 5,102,483 | * 4/1992 | Sawada et al. | 156/89 |
| 5,326,519 | * 7/1994 | Claussen | 264/65 |
| 5,607,630 | * 3/1997 | Claussen | 264/60 |

FOREIGN PATENT DOCUMENTS 0 268 814 A2  6/1988  (EP) .

* cited by examiner

*Primary Examiner*—Michael J. Carone
*Assistant Examiner*—Kyongtack K. Mun
(74) *Attorney, Agent, or Firm*—Connolly Bove Lodge & Hutz, LLP

(57) ABSTRACT

A fuel assembly (1) comprising a plurality of elongated elements (3) filled with nuclear fuel and at least one component (5, 6, 7) for retaining the elongated elements (3), wherein the retaining component (5, 6, 7) is completely or partly made of a ceramic material.

6 Claims, 6 Drawing Sheets

Fig. 1a
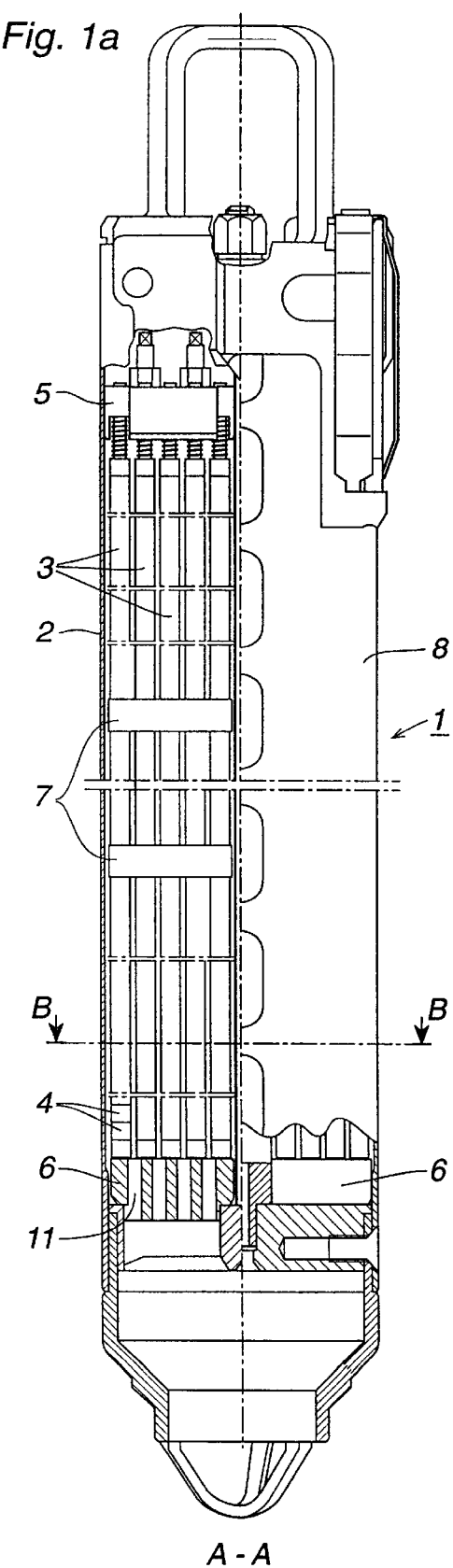
A - A
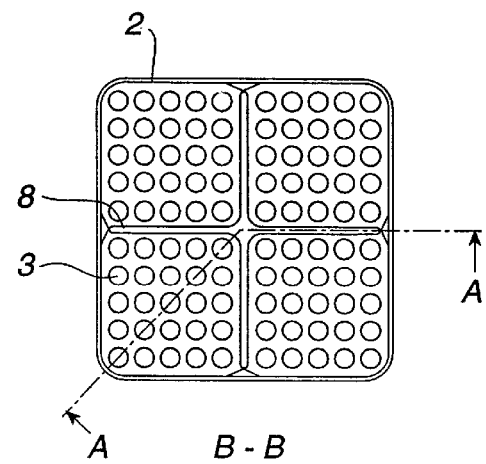
B - B
Fig. 1b

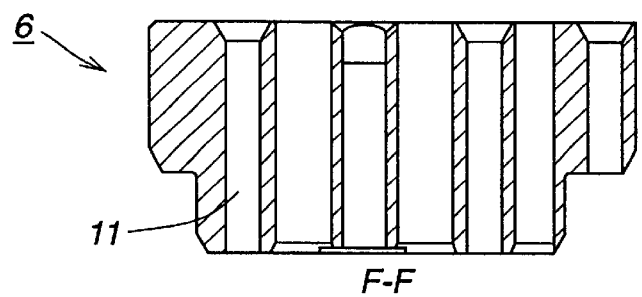
*Fig. 5a*
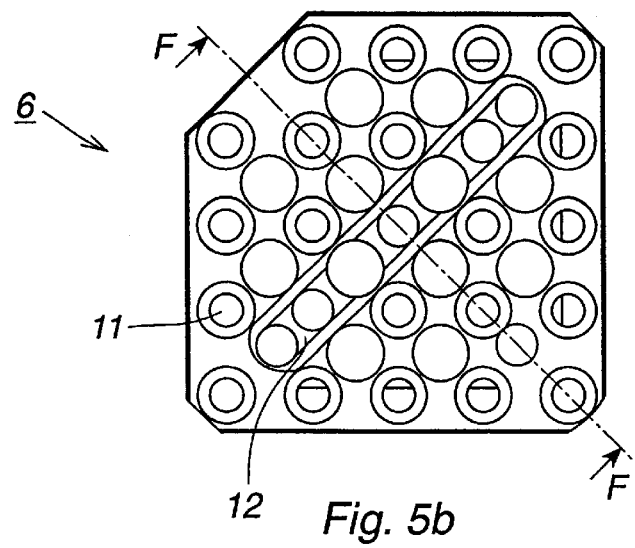
*Fig. 5b*
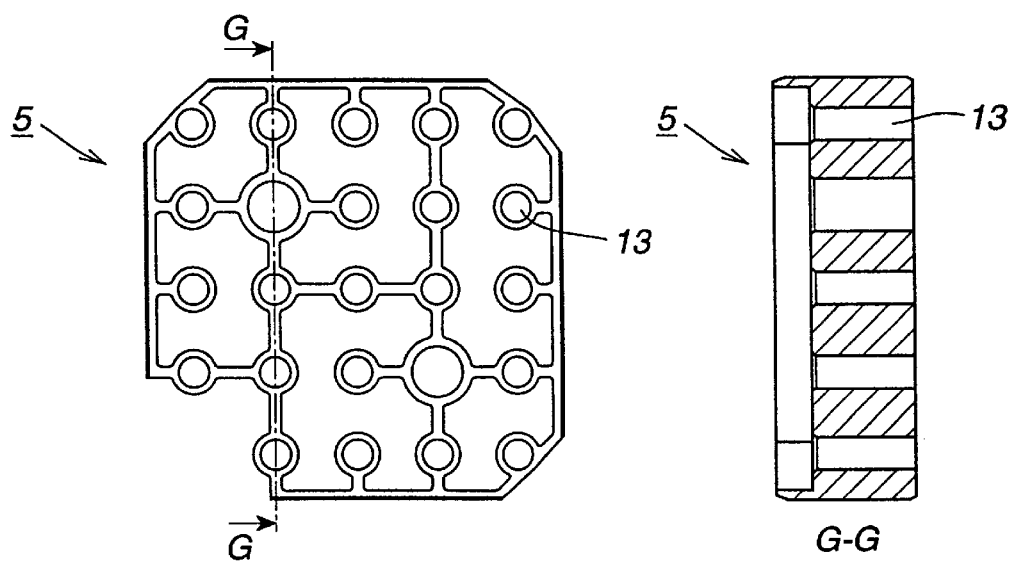
*Fig. 6a*   *Fig. 6b*

FUEL ASSEMBLY COMPRISING A COMPONENT FOR RETAINING ELONGATED ELEMENTS

TECHNICAL FIELD

The present invention relates to components of a light-water nuclear reactor. The invention specifically relates to a ceramic device to retain fuel rods therein.

BACKGROUND OF THE INVENTION

A fuel assembly in a boiling-water nuclear reactor comprises a long tubular container. The container is often made with a rectangular or square cross section and is open at both ends to make possible a continuous flow of coolant through the fuel assembly. The fuel assembly comprises a large number of equally long tubular fuel rods, arranged in parallel in a defined typically symmetrical, pattern. The fuel rods are retained at the top by a top tie plate and at the bottom by a bottom tie plate. To allow optimum coolant optimum flow along the fuel rods, it is important to keep these at a distance from each other and prevent them from bending or vibrating when the reactor is in operation. If the flow of coolant around a fuel rod is prevented, so-called dryout may occur on the surface of the fuel rod, which may result in damage of the fuel rod. To secure the flow of coolant along the fuel rods, a plurality of spacers are distributed longitudinally along the fuel assembly; however, each new spacer contributes to the pressure drop across the fuel assembly. To minimize the risk of dryout to the fuel assembly the flow of coolant is maintained at a fixed margin, the dryout margin, designed to exceed the coolant flow at which dryout occurs under the relevant conditions.

A fuel assembly for a pressurized-water nuclear reactor has, in principle, the same construction as a fuel assembly for a boiling-water nuclear reactor except that the fuel rods are not enclosed by any tubular container and that their number is greater.

Normally, a fuel assembly comprises components for retaining the elongated elements, such as spacers, top tie plate and bottom tie plate. These components are normally made of metallic materials, preferably of zirconium alloys or so-called superalloys based on nickel. The resilient clamping force which the retaining components apply to the fuel rods decreases, relaxes, during operation of the reactor as a consequence of the metallic material mechanically degrading, under the conditions prevailing in the fuel assembly during operation. In addition, corrosion, erosion and abrasion damage arise under conditions which prevail in the fuel assembly during operation of the nuclear reactor. The degradation of the retaining components, as well as the occurrence of abrasion, erosion and corrosion damage, may be predicted. When dimensioning these components, the degradation is taken into consideration by oversizing the thickness of the material of the components. This oversizing of the thickness of the material of the components results in an increase of the pressure drop across the fuel assembly.

The object of the present invention is therefore to provide a device for retaining elongated elements such as fuel rods in a fuel assembly for a light-water nuclear reactor. The device makes possible an increased operating margin, that is, a margin with respect to dryout as a consequence of too low a coolant flow such that the components included in the device exhibit both improved mechanical properties, including a reduced relaxation of the clamping force which is applied to the elongated elements, and an improved resistance to damage caused by corrosion, erosion and/or abrasion.

SUMMARY OF THE INVENTIONS

According to one aspect of the present invention, a fuel assembly comprising a device for retaining elongated elements, such as fuel rods, is provided. The retaining element of this invention retains its mechanical rigidity under the conditions of heat, fluid flow and other environmental conditions that occur during the operation of a nuclear reactor.

A fuel assembly according to the invention comprises components, which are completely or partially made of a ceramic material, such as zirconium dioxide. Preferably, a two-phase zirconium dioxide is used, based on material where the high-temperature shape of the zirconium dioxide has been stabilized by the addition of a stabilizing dopant, such as an oxide of magnesium, calcium, yttrium, or a mixture of two or more of these oxides, that is, a so-called partially stabilized zirconium dioxide.

These components are preferably formed in such a way that the ceramic part of a component constitutes a mechanically self-supporting structure.

The good mechanical properties and good resistance against erosion, corrosion and abrasion of the ceramic parts of the components which are included in a device according to the invention are ensured by manufacturing ceramic bodies with low porosity and with few and controlled defects by pressing and sintering, starting from a ceramic powder. Especially advantageous is the internal stress state which exists in a ceramic body of a partially stabilized zirconium dioxide.

One advantage of the enhanced resistance to corrosion, erosion or abrasion of the components included in the device is that the contamination of the reactor water by radioactive corrosion products is prevented. The radioactive corrosion products are thus prevented from being deposited in the circulation system for the reactor water and from there emitting radioactive radiation, against which the personnel have to protect themselves in connection with service work in this circulation system.

According to the invention, forming at least one mechanically supporting part of the components, included in a fuel assembly, for retaining the elongated elements such as spacers, bottom tie plate and top tie plate in a ceramic material, the thickness of the material of this component may be considerably reduced. In addition, the risks of degradation of the mechanical properties of the components as a result of creeping and/or as a result of damage caused by erosion, corrosion and/or abrasion are minimized. The reduced thickness of the material also results in a reduction of the pressure drop across a fuel assembly which may be utilized for arranging more spacers in the fuel assembly. This results in a stabilization of the fuel assembly and the flow of coolant through the same, thus attaining the object of the invention, that is, to increase the dryout margin. By increasing the dryout margin, the total cost of the fuel cycle is reduced.

BRIEF DESCRIPTION OF THE DRAWINGS

FIG. 1a shows a cross-section of a fuel assembly of boiling-water reactor type.

FIG. 1b shows cross-section of FIG. 1a taken along line B—B of same fuel assembly.

FIG. 3b shows a cross-section of FIG. 3a taken along line C—C.

FIG. 4b shows a cross-section of FIG. 4a taken along line D—D. FIG. 4d shows a cross-section of FIG. 4c taken along line E—E.

FIGS. 5a–b show an embodiment of a ceramic bottom tie plate for use in a fuel assembly according to the invention. FIG. 5a shows a section F—F in FIG. 5b.

FIGS. 6a–b show an embodiment of a ceramic top tie plate for use in a fuel assembly according to the invention. FIG. 6b shows a cross-section of FIG. 6a taken along line G—G.

DETAILED DESCRIPTION OF THE PREFERRED EMBODIMENTS

Figure 2:
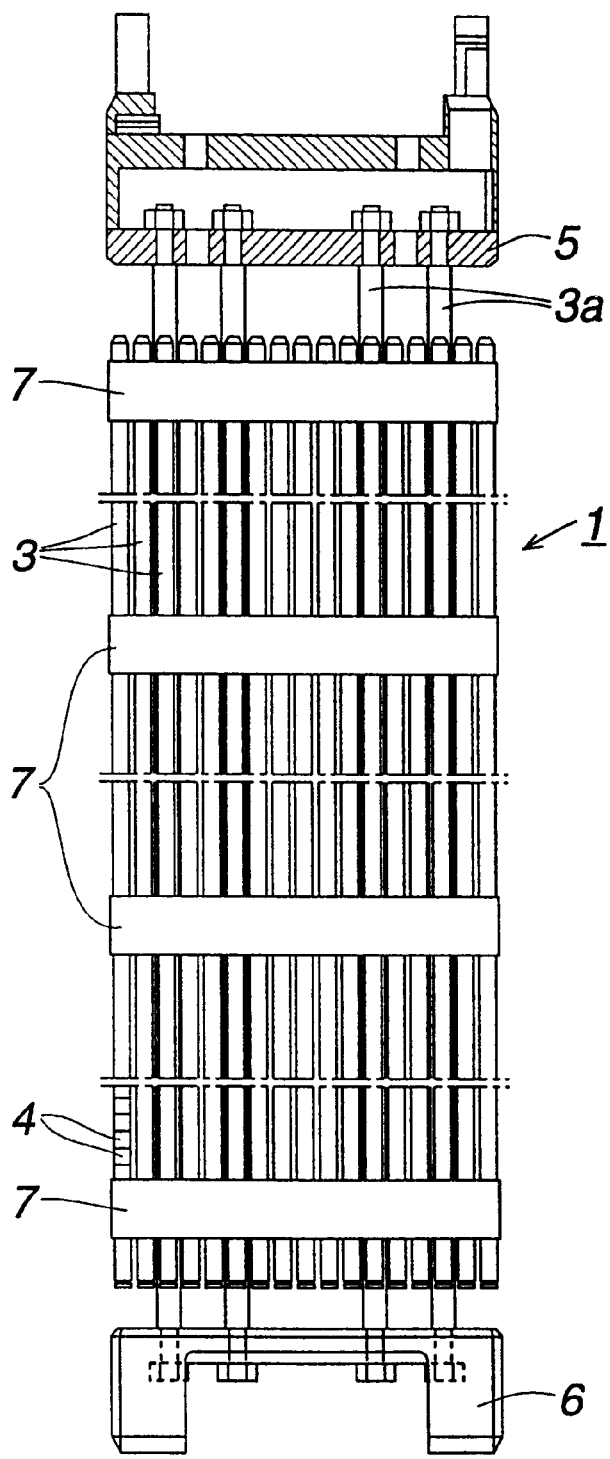
FIG. 2 shows a fuel assembly of pressurized-water reactor type with spacers according to the invention.

FIG. 1a shows a fuel assembly 1 of boiling-water type which comprises a long tubular container, of rectangular cross section, referred to as a fuel channel 2. The fuel channel 2 is open at both ends so as to form a continuous flow passage, through which the coolant of the reactor flows. The fuel assembly 1 comprises a large number of equally long tubular fuel rods 3 arranged in parallel in a bundle, in which pellets 4 of a nuclear fuel are arranged. The fuel rods 3 are arranged separated into four orthogonal sub-bundles by means of a cruciform support device 8, see also FIG. 1b. The respective sub-bundle of fuel rods 3 is retained at the top by a top tie plate 5 and at the bottom by a bottom tie plate 6. The fuel rods 3 in the respective sub-bundle are kept spaced-apart from each other by means of spacers 7 and are prevented from bending or vibrating when the reactor is in operation. The spacer 7 according to the invention may, of course, also be used in a reactor of boiling-water type which has no cruciform support device 8 but instead is provided with, for example, one or more water tubes.

FIG. 2 shows a fuel assembly 1 of pressurized-water type which comprises a number of elongated tubular fuel rods 3 and control rod guide tubes 3a, arranged in parallel. In the fuel rods 3, pellets 4 of a nuclear fuel are arranged. The control rod guide tubes 3a are retained at the top by a top nozzle 5 and at the bottom by a bottom nozzle 6. The fuel rods 3 are kept spaced-apart from each other by means of spacers 7.

Figure 3C:
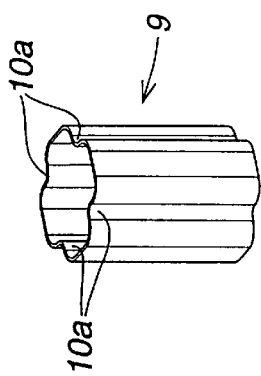
FIGS. 3c–d show alternative embodiments of a sleeve for such spacers.
Figure 3D:
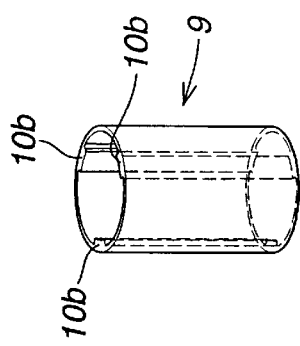
Figure 3B:
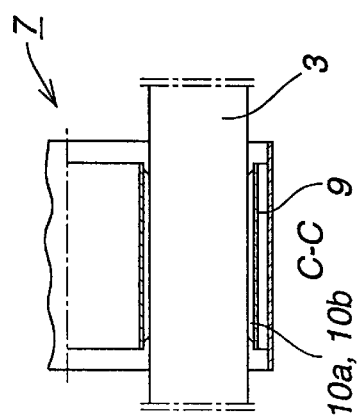
FIGS. 3a–b show an embodiment of a ceramic spacer for use in a fuel assembly according to the invention.
Figure 3A:
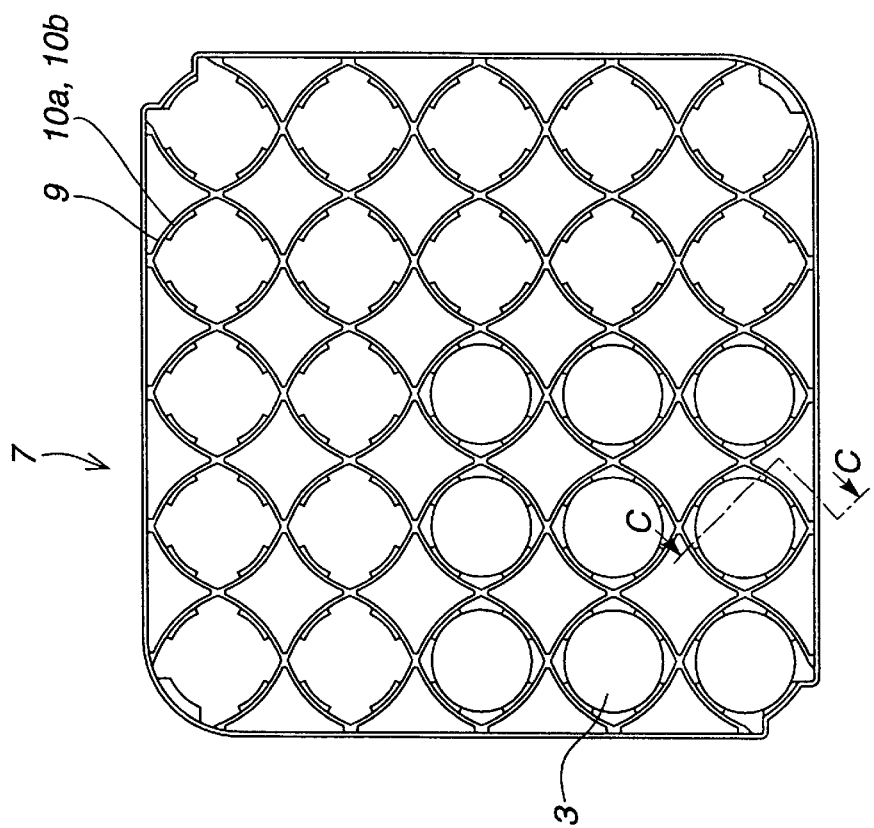

FIGS. 3a, 3b show an embodiment of a ceramic retaining component, more particularly the spacer 7. The spacer 7 is formed as a lattice structure with sleeve-formed cells 9. At least some of the cells 9 are arranged to surround and position elongated elements in a fuel assembly according to the invention. The elongated element may comprise, for example, a fuel rod 3 or a control rod guide tube 3a.

The cells 9 which are adapted to surround an elongated element 3 are provided with damping surfaces 10a and/or 10b, uniformly distributed around the periphery of the cell 9 and along the whole length of the cell 9. In a preferred embodiment, the number of damping surfaces 10a, 10b is four and they are arranged with a pitch angle of 90°. Such a sleeve cell 9 with four damping surfaces 10a is shown in FIG. 3c. The damping surfaces 10a are thus formed as elongated grooves, the surface of which, facing inwards towards the center of the sleeve 9, is adapted to connect closely with the outer surface of an elongated element 3.

FIG. 3d shows an alternative embodiment of a sleeve cell 9. This sleeve cell is provided with three damping surfaces 10b which are evenly distributed along the periphery of the sleeve 9. The damping surfaces 10b are formed as ridges extending along the whole axial extent of the sleeve. The ridges are formed with a surface facing inwards towards the center of the sleeve 9, which surface is concave for the purpose of connecting closely with the outer convex surface of an elongated element 3.

The damping surfaces 10a, 10b are arranged so as to be situated very close to the elongated element 3, 3a extending through the cell 9, but without making contact therewith. When coolant flows upwards through the fuel assembly 1, a thin liquid film is formed between the elongated elements 3, 3a and the damping surfaces 10a, 10b. In this way, a spacer 7 with hydraulic damping of the movements of the respective elongated elements 3, 3a in the fuel assembly 1 is achieved.

The above embodiments of a ceramic spacer 7 are manufactured by cutting ceramic tubes with damping surfaces 10a, 10b into tube sleeves 9 in suitable lengths. The tube sleeves 9 are then joined together into a spacer lattice with the aid of sintering with a powder of the same composition as that of the material in the tube sleeves 9.

An alternative way of manufacturing ceramic parts for retaining a bundle of elongated elements in a nuclear fuel assembly is to start from a ceramic material in powdered state and shape and consolidate this by pressing at elevated pressure, combined with sintering at elevated temperature. Preferably, the ceramic powder has then been preformed, using a suitable method, into a green body, which is consolidated and sintered into an essentially tight ceramic body. The tight ceramic body has few internal defects by having been pressed isostatically at an elevated temperature, so-called hot-isostatic pressing, HIP. Examples of the above-mentioned parts are shown in FIGS. 4–6 and will be described in greater detail below.

In the following, a more detailed description will be made of a preferred method for manufacturing a ceramic body which constitutes at least part of a retaining component in a fuel assembly 1 according to the invention.

A ceramic powder, suitably a powder of a partially stabilized zirconium dioxide (PSZ), is mixed with an organic binder, such as wax or another polymer. The ceramic powdered material with addition of binder is then preformed into a porous body in a suitable way by slip casting, pressing, extrusion, injection moulding, etc., into a so-called green body. The mixture of binder and ceramic powder may also be preformed into a body by spray-drying, which may then be formed by means of pressing, extrusion or by being filled into a suitable mould.

The porous green body is thereafter treated in a plant for driving off the temporary organic binder. Driving off the binder takes place by heating, vacuum treatment or by a combined heating and vacuum treatment. By heating, the green body shrinks linearly in the order of magnitude of 15% in such a way that the shape of the component is retained. To be able to consolidate the porous body, it must be degassed and enclosed in a continuous tight casing, which is impenetrable to the pressure medium used during the isostatic pressure.

Usually, a glass casing is applied to the porous body, the porous body then being placed in a mould together with a powder of a glass or a glass-forming material. Before the isostatic pressing, the porous body and the glass powder are heated, whereby the powdered glass or glass-forming material forms a tight coherent casing around the porous body. Thereafter, the injection-moulded object is sintered and consolidated by hot-isostatic pressing in a high-pressure furnace, whereby the component is subjected to a high temperature at a high pressure. The encapsulation is then removed using a suitable method, leaching, blasting, etc. In certain cases, a subsequent processing with conventional methods is needed, such as, for example, grinding to give the product its final shape. This especially applies to slots and recesses which are not rotationally-symmetrical and grinding to fulfill given tolerance requirements.

In an alternative embodiment, the component is pressed in cold state, whereby another encapsulating material, which is flexible at the pressing temperature, such as a plastic or a rubber material, which is impenetrable to the pressure medium used, is used. The cold-isostatically pressed body is then sintered in a conventional heating furnace.

The advantage of forming a ceramic body by isostatic pressing is that the number of pores and other internal defects in the material are considerably reduced in relation to a corresponding body manufactured by common, linear pressing.

Another advantage is less mechanical subsequent processing since, with isostatic pressing, bodies with a more complex shape may be manufactured. Subsequent treatment is usually needed only for non-rotationally symmetrical objects to be formed and for fulfilling certain tolerance requirements. It is less expensive to process into close tolerances than to try to check shrinkage, form filling etc. so accurately that the pressed body fulfils given tolerances.

Figure 4B:
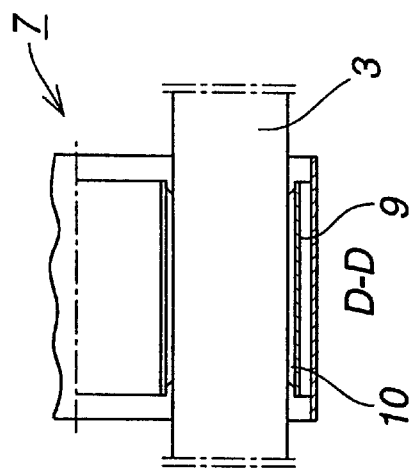
FIGS. 4a–d show alternative embodiments of a ceramic spacer for use in a fuel assembly according to the invention.
Figure 4A:
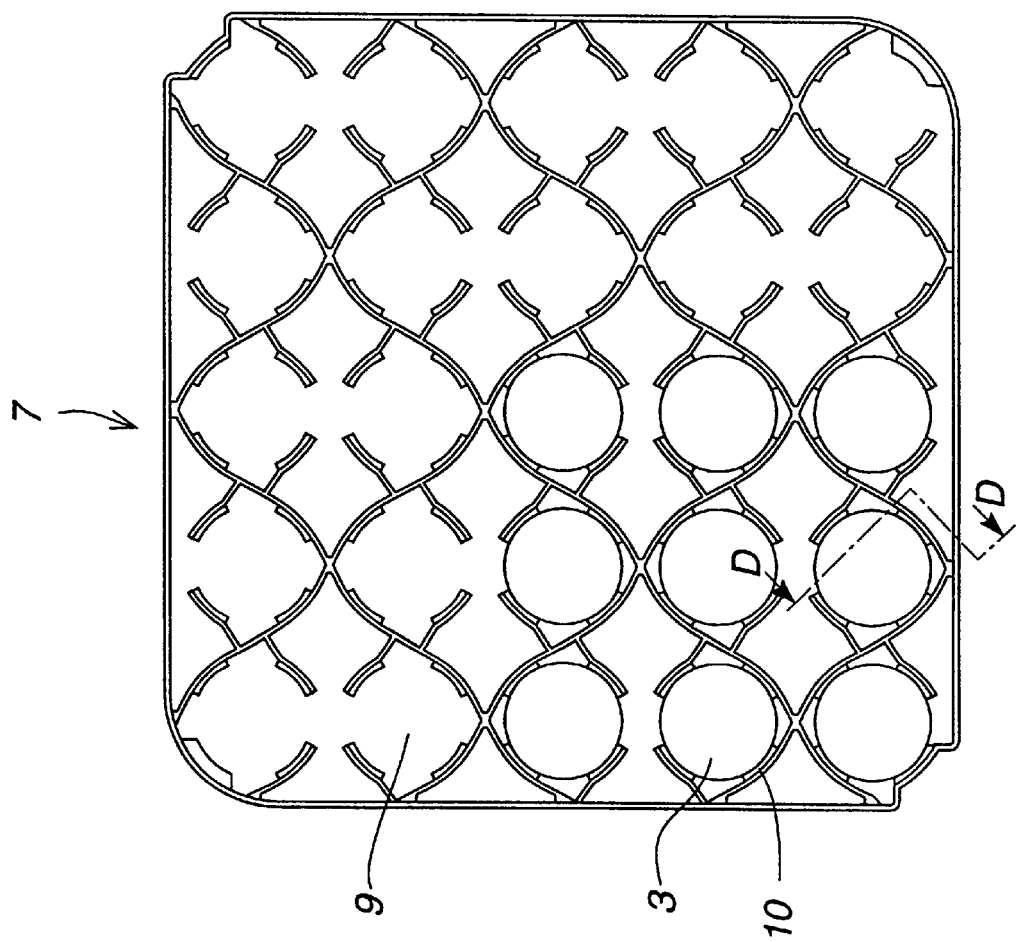

FIGS. 4a–d show alternative embodiments of a ceramic spacer 7 obtained according to the method stated above. The spacer 7 in FIG. 4a is formed in a manner corresponding to that shown in FIGS. 3a, 3b. However, the lattice structure in FIGS. 4a, 4b has been given a more open structure. The support surface 10 may be formed in a manner corresponding to that shown in FIGS. 3c and 3d, see reference numerals 10a and 10b, respectively.

Figure 4E:
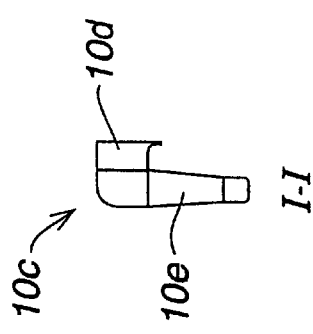
FIG. 4e shows the spring in a cross-section of FIG. 4c taken along line I—I.
Figure 4D:
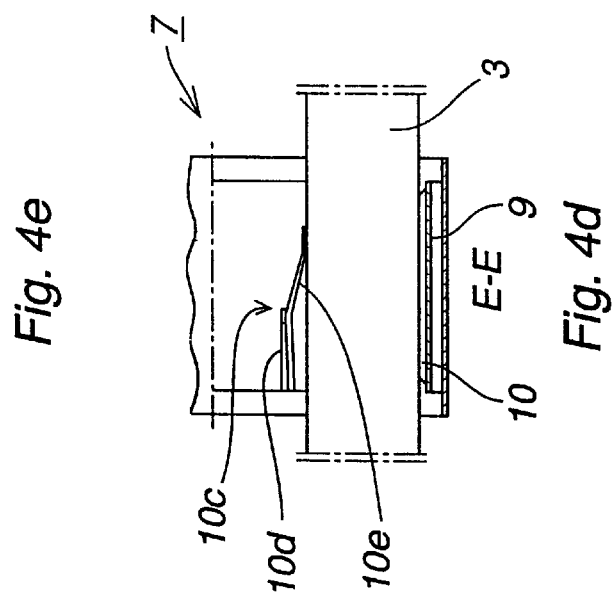
Figure 4C:
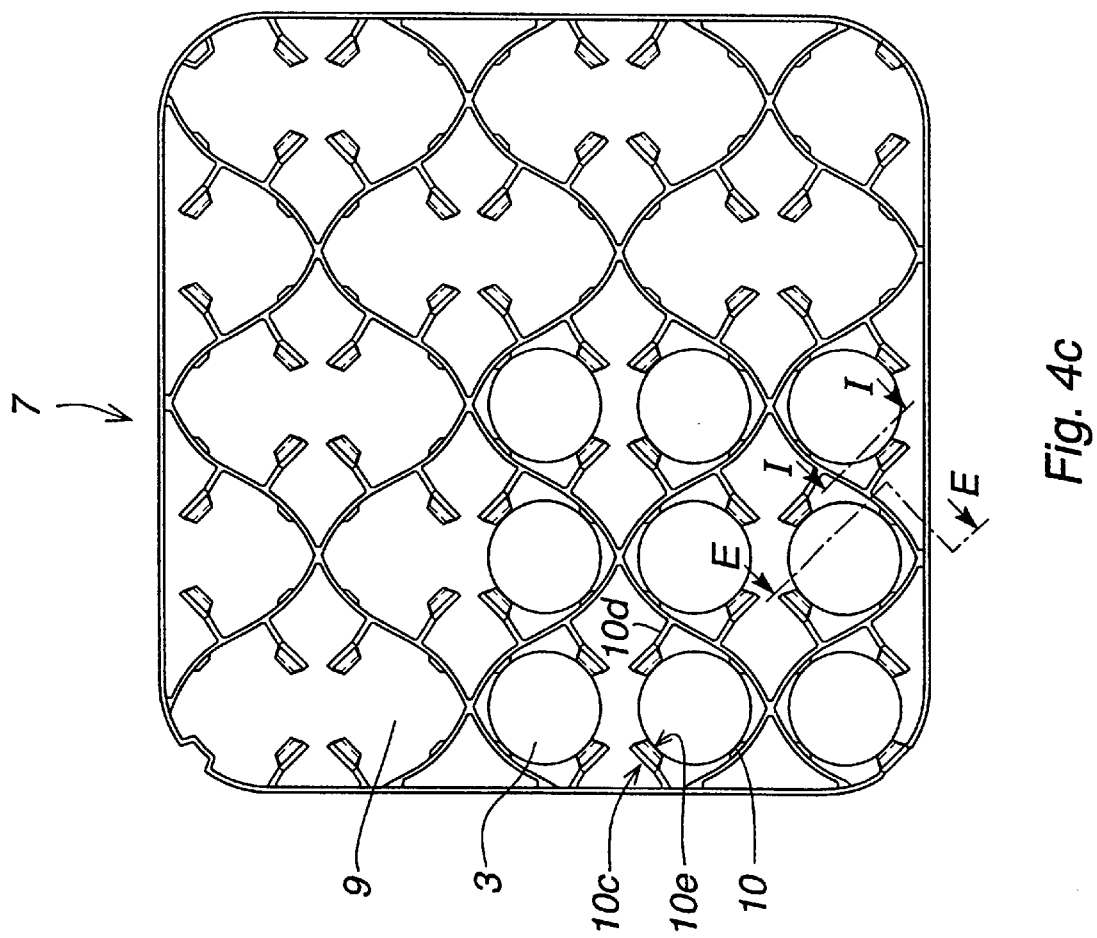

FIGS. 4c, 4d and 4e show another embodiment of a spacer 7 manufactured according to the method described above. The spacer 7 has the same open structure as the spacer 7 shown in FIG. 4b. The spacer 7 according to FIG. 4d comprises both elongated support surfaces 10, designed as described above, and springs 10c. The springs 10c are designed as a part projecting from the spacer structure, in the figure provided with reference numeral 10d, and an elongated part 10e. The springs 10c have a first end, which conforms to the structure, and a second free end. In the figure, the respective free ends are facing upstream in comparison with the coolant flowing upwards through the assembly. They may, of course, also be arranged with their free ends facing downstream. The springs 10c are formed such that their respective free ends are arranged nearer the center of the cell 9 than their first ends which conform to the structure. Further, the respective free ends are adapted to make contact with an elongated element 3, 3a extending through the cell 9. Two of the support surfaces suitably consist of elongated fixed supports 10 and two of resilient supports 10c, the supports being evenly distributed around the periphery of the cell 9.

The springs 10e in the ceramic material may be utilized as springs up to the yield point of the material. This resilient capacity is sufficient to position the elongated elements 3 in the spacer 7.

FIGS. 5a, 5b show an embodiment of another ceramic retaining component, more particularly a bottom tie plate 6, see also FIG. 1. The bottom tie plate 6 is made in one piece according to the method described above. The bottom tie plate 6 is formed with a plurality of substantially circular openings 11 for receiving elongated elements 3 (see FIG. 1) and for passage of the coolant flowing through the fuel assembly 1. FIG. 5b shows that the bottom tie plate 6 is provided with a diagonal opening 12. The diagonal opening 12 is formed during the injection moulding. In an alternative embodiment, the diagonal opening is formed by means of mechanical processing after the rest of the body has been completed in accordance with the method described above.

FIGS. 6a, 6b show an embodiment of still another ceramic retaining component, more particularly a top tie plate 5, see also FIG. 1. The top tie plate 5 is formed with a plurality of substantially circular openings 13 for receiving elongated elements 3 and an open structure between these openings for passage of the coolant flowing upwards through the fuel assembly 1. The top tie plate 5 is manufactured according to the method described above.

The bottom and top tie plates, respectively, shown in FIGS. 5 and 6 are intended for a boiling water reactor. For a pressurized-water reactor, the bottom and top tie plates, respectively, are formed in a corresponding way with openings and/or milled grooves.

What is claimed is:

1. A fuel assembly comprising:
   a plurality of elongated elements filled with nuclear fuel; and
   at least one component for retaining the elongated elements, wherein the at least one retaining component consists essentially of a ceramic material.

2. The fuel assembly according to claim 1, wherein the ceramic material is based on zirconium dioxide.

3. The fuel assembly according to claim 2, wherein the ceramic material comprises partially stabilized zirconium dioxide.

4. The fuel assembly according to claim 3, wherein the partially stabilized zirconium dioxide comprises magnesium oxide.

5. The fuel assembly according to claim 1, wherein the retaining component is a spacer, a bottom tie plate, or a top tie plate.

6. The fuel assembly, according to claim 5, wherein the spacer comprises internal springs formed in the ceramic material.

* * * * *